United States Patent
Trautenberg

(10) Patent No.: US 8,125,387 B2
(45) Date of Patent: Feb. 28, 2012

(54) REGIONAL SATELLITE POSITIONING SUPPLEMENTARY SYSTEM

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 630 days.

(21) Appl. No.: 12/203,588

(22) Filed: Sep. 3, 2008

(65) Prior Publication Data

US 2009/0058722 A1 Mar. 5, 2009

(30) Foreign Application Priority Data

Sep. 4, 2007 (DE) .......................... 10 2007 041 772

(51) Int. Cl.
G01S 1/08 (2006.01)
G01S 19/48 (2010.01)
G01S 19/05 (2010.01)
G01C 21/00 (2006.01)

(52) U.S. Cl. .............. 342/386; 342/357.31; 342/357.42; 701/213

(58) Field of Classification Search ............ 342/357.02, 342/357.06, 357.09, 386, 357.21, 357.31, 342/357.42, 357.63; 701/207, 213
See application file for complete search history.

(56) References Cited

U.S. PATENT DOCUMENTS

| 2002/0101374 A1* | 8/2002 | Mutoh et al. ............. 342/357.09 |
| 2004/0145517 A1 | 7/2004 | Kinal et al. |
| 2005/0090265 A1 | 4/2005 | Abraham |
| 2005/0157672 A1 | 7/2005 | Dodel |
| 2006/0164297 A1 | 7/2006 | Hernandez-Pajares et al. |
| 2007/0109186 A1* | 5/2007 | Fujiwara et al. ......... 342/357.09 |
| 2009/0013210 A1* | 1/2009 | McIntosh et al. ................. 714/4 |

FOREIGN PATENT DOCUMENTS

| DE | 103 56 580 A1 | 7/2005 |
| WO | WO 99/18677 A1 | 4/1999 |

OTHER PUBLICATIONS

European Search Report dated Nov. 3, 2008 with partial English translation (Ten (10) pages).
A. Steciw, et al., "A European Satellite Navigation Programme", IEE Colloquium on Implementation of GNSS, 1995, London.
German Office Action including English translation dated May 9, 2008 (Five (5) pages).

* cited by examiner

*Primary Examiner* — Dao Phan
(74) *Attorney, Agent, or Firm* — Crowell & Moring LLP

(57) ABSTRACT

Systems and methods for a navigation satellite of a satellite positioning supplementary system are provided in which a unit generates a navigation signal with a signal strength being dimensioned in such a way that it is still possible to receive signals of other satellite navigation systems.

14 Claims, 3 Drawing Sheets

REGIONAL SATELLITE POSITIONING SUPPLEMENTARY SYSTEM

CROSS REFERENCE TO RELATED APPLICATIONS

This application claims priority under 35 U.S.C. §119 to German Patent Application No. 10 2007 041 772.3-35, filed Sep. 4, 2007, the entire disclosure of which is herein expressly incorporated by reference. This application is related to U.S. patent application Ser. No. 12/203,589 entitled Regional Navigation Satellite Supplementary System, the entire disclosure of which is herein expressly incorporated by reference.

BACKGROUND AND SUMMARY OF THE INVENTION

The invention relates to a regional satellite positioning supplementary system.

Navigation systems are limited in their precision by, inter alia, a lack of modeling of the atmospheric signal propagation. The continuity of navigation systems is negatively influenced by the chronological and spatial unavailability of signals on specific frequencies from specific signal sources.

Navigation system precision can be improved using known dual-frequency systems. These systems make the ionosphere propagation effects measurable at the user, but the availability and continuity of such systems necessarily require receipt of both signals to perform a measurement. In addition, regional propagation models for the ionosphere are known according to the prior art, in which the ionosphere is modeled as a plane at a specific height, and the ionosphere runtime change through the ionosphere is modeled by interpolation of the atmospheric parameters between two-dimensional lattice points on this plane and the penetration angle of the signal through this plane.

There are local systems according to the prior art for tropospheric propagation modeling, which are commonly referred to as "differential GPS." These systems require high data rates, and accordingly the typical differential methods require a quasi-direct visibility of the points distributing the differential correctors. Differential GPS systems also require a relatively dense network of points that distribute the differential correctors. Accordingly, while such systems are well-suited for increasing the precision within smaller areas, construction of these systems on a larger scale, such as for the country of Germany, would require a very high cost outlay.

Exemplary embodiments of the present invention provide devices and methods that allow better positioning by achieving better precision of the determined position, better continuity of the position system, better availability of the position system, and/or better integrity of the position system.

Exemplary embodiments of the present invention provide more precise modeling of the signal propagation through a satellite positioning supplementary system, which increases the precision of the determined position of the navigation system.

Exemplary embodiments of the present invention do not require the modeling of the signal propagation for the increase in precision. Accordingly, a second frequency of the satellite positioning supplementary system and also of the navigation system may now be used to increase the continuity and/or availability.

Exemplary embodiments of the present invention also provide more precise models and model parameters for the signal propagation in the atmosphere, which improves the integrity, continuity, and/or availability of the position solution.

Exemplary embodiments of the present invention use the signals and messages of the satellite positioning supplementary system to provide the system time of the navigation system which is supplemented by the satellite positioning supplementary system. Thus, the signal of the navigation system which the satellite positioning supplementary system supplements is able to be received under more unfavorable circumstances and/or received more precisely, which in turn increases the precision, continuity, and availability. This effect may also be reinforced by optionally providing the data which are carried on the signals of the navigation system by the signals of the satellite positioning supplementary system.

According to one aspect of the present invention, a device for a satellite positioning supplementary system is provided that models the signal propagation of navigation signals. The navigation satellites of the satellite positioning supplementary system which are located over an area in which a service is to be provided are located close to the zenith and broadcast a relatively strong navigation signal into the service area. According to the invention, the size of the service area is selected in such a way that enough power exists in the satellites of the satellite positioning supplementary system to achieve the required signal strength. Alternatively, with a permanently predefined service area, the satellite is designed in such a way that so much power is present in the satellite that the required signal strength is achieved. For example, the satellites may fly on suitable geosynchronous orbits, on geosynchronous orbits in or near the equatorial plane, or also on so-called Molniya orbits.

The satellites of the satellite positioning supplementary system are typically equipped with a (vertically) oriented antenna, to achieve the highest possible signal strength in the service area with the least possible power consumption, the signal strength is dimensioned in such a way that it is still possible to receive signals of other satellite navigation systems. This may be achieved by a suitable selection of the coding of the signals. In other words, according to the invention, the maximum signal strength is emitted which may be achieved for a given coding, but so that it is still possible to receive the signals of other satellite navigation systems.

In addition, the antenna may be tracked in such a way that optimum signal strength is possible in the service area.

The navigation signals thus generated are significantly stronger than normal navigation signals. Therefore, they may be received and measured significantly more rapidly or precisely under significantly more unfavorable conditions or under identical conditions.

The signals not only have the property that pseudo-runtime measurements may be performed using them, but they also contain precise models for modeling the propagation of satellite navigation signals which may be received in the service area and models which allow the transmission time and the transmission location of the signals of the satellite positioning supplementary system to be ascertained in the timescale of the navigation signal. A model may also be transmitted to ascertain the transmission time in the system timescale of another navigation system.

A user receiver may then ascertain the possible offset between the system time of a navigation system and its own receiver clock time, to receive signals which were previously not received or also previously not receivable. Signals may not have been previously receivable, for example, because the receiver timescale and the system timescale have deviated too far from one another, or because the reference frequency of the receiver has deviated too strongly from the reference frequency of the system.

In another aspect of the present invention, the signals of the navigation satellites of the satellite positioning supplementary system may also carry user messages which are carried on the signals of other navigation systems, and thus the signals of the other navigation signals may be received under still more unfavorable conditions or still more precisely.

In accordance with the present invention, the ionosphere can be described by multiple layers at various heights, the electron density at support points in each layer being transmitted to the user together with the reference height for this layer through the signals of the navigation satellites of the satellite positioning supplementary system. This ionosphere model is transmitted on multiple frequencies to the user. It is ensured that the complete information is transmitted on every frequency, but another part of the model parameters is transmitted on different frequencies at each instant. The same information may also optionally be transmitted simultaneously on all frequencies. The electron density along the signal propagation paths is then determined by interpolation. The effect on the signal is then calculated from the integral over the electron density, which may optionally also be weighted using a function of the magnetic field.

In accordance with the present invention, the troposphere can be is modeled in such a way that the air pressure, temperature and/or the absolute ambient humidity is transmitted to the user as a function of the height for selected locations in the service area by the signals of the navigation satellites of the satellite positioning supplementary system. The index of refraction of the atmosphere along the signal propagation path is then determined from this data by interpolation and the tropospheric run time delay is thus determined.

Arbitrary combinations of the above are also disclosed by the invention.

Exemplary embodiments of the present invention also include a method for modeling the signal propagation of a navigation signal. This method comprises a step for dimensioning the signal strength of the navigation signal in such a way that it is still possible to receive signals of other satellite navigation systems.

In accordance with the present invention, the ionosphere is described by multiple layers at various heights, the electron density at support points in each layer being transmitted to the user together with the reference height for this layer through the signals of the navigation satellites of the satellite positioning supplementary system. This ionosphere model is transmitted on multiple frequencies to the user. It is ensured that the complete information is transmitted on every frequency, but another part of the model parameters is transmitted on different frequencies at each instant. The electron density along the signal propagation paths is then determined by interpolation. The effect on the signal is then calculated from the integral over the electron density, which may optionally also be weighted with a function of the magnetic field.

In accordance with the present invention, the troposphere is modeled in such a way that the air pressure and/or the temperature and the absolute ambient humidity is transmitted to the user as a function of the height for selected locations in the service area by the signals of the navigation satellites of the satellite positioning supplementary system. The index of refraction of the atmosphere along the signal propagation path is then determined from this data by interpolation and the tropospheric run time delay is thus determined.

The features specified in connection with the embodiments of the devices of the invention are also disclosed for the method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
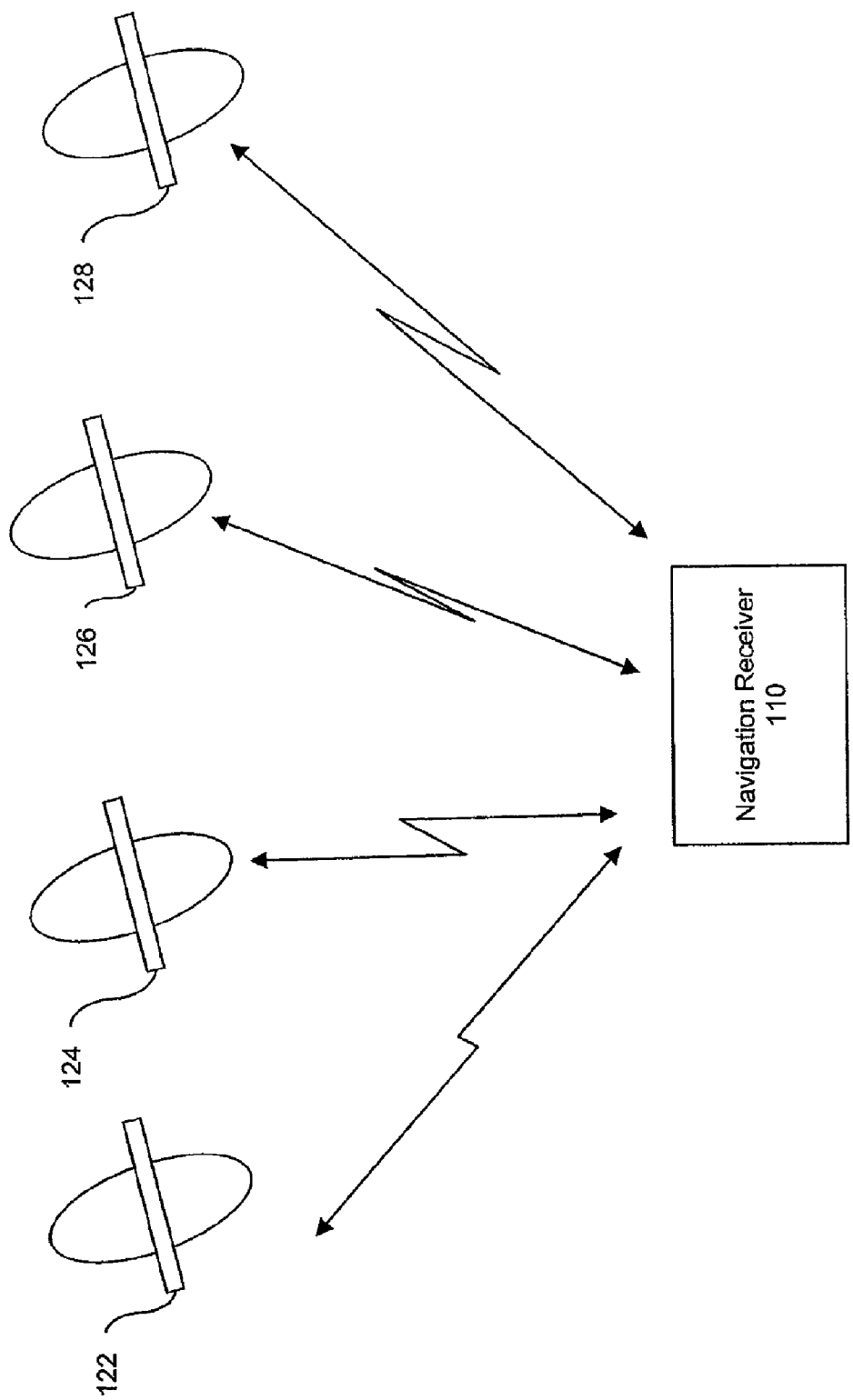
FIG. 1 is a block diagram of an exemplary system in accordance with the present invention.

FIG. 1 is a block diagram of an exemplary system in accordance with the present invention. The system includes a satellite positioning system that comprises a plurality of satellites 122-126 and a satellite positioning supplementary system comprising one or more satellites 128. A navigation receiver 110 can determine its position using signals received from satellites 122-128, as described in more detail herein. Although FIG. 1 illustrates a particular number of satellites for the positioning system and the supplementary system, the present invention can include more satellites than those illustrated.

Figure 2:
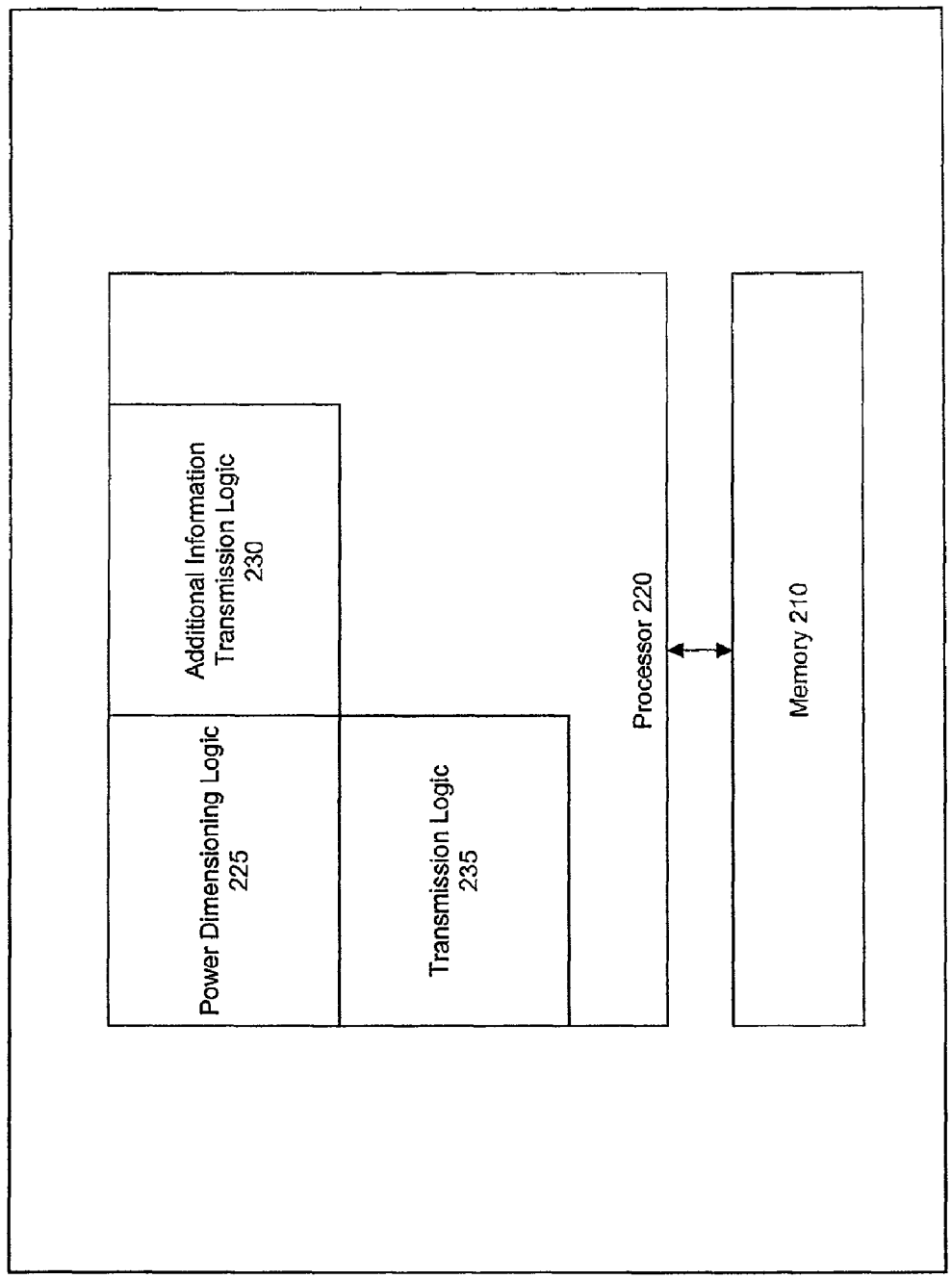
FIG. 2 is a block diagram of an exemplary device of a satellite positioning supplementary system in accordance with the present invention.

FIG. 2 is a block diagram of an exemplary device of a satellite positioning supplementary system in accordance with the present invention. The device includes memory 210 coupled to processor 220. Processor 220 includes power dimensioning logic 225, additional information transmission logic 230 and transmission control logic 235, which will be described in more detail in connection with FIG. 3. Processor 220 can be any type of processor including a field programmable gate array (FPGA), application specific integrated circuit (ASIC) and/or a microprocessor. When processor 220 is a microprocessor, logic 225-235 can be processor-executable instructions loaded from memory 210.

Figure 3:
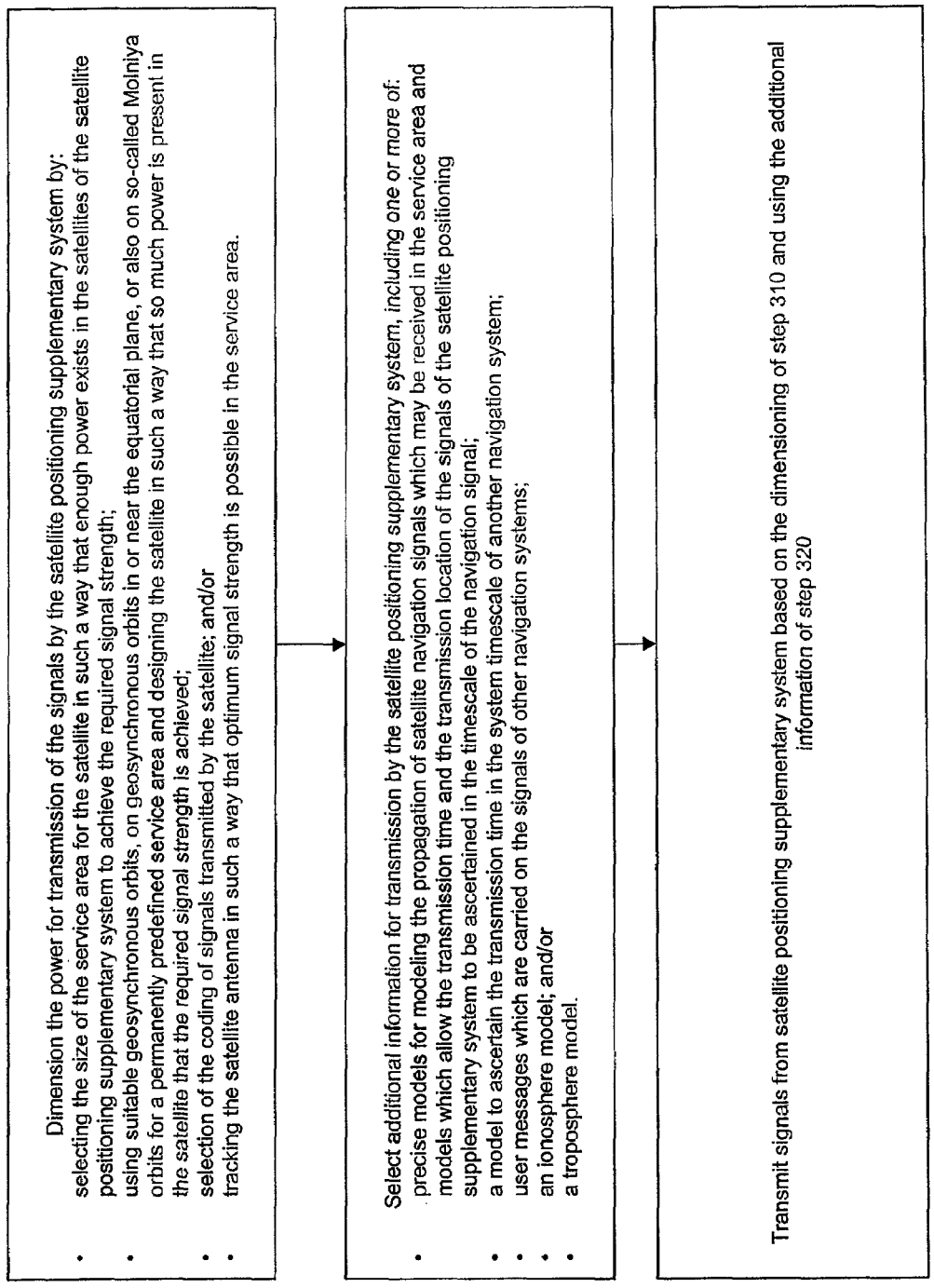
FIG. 3 is a flow diagram of an exemplary method in accordance with the present invention.

FIG. 3 is a flow diagram of an exemplary method in accordance with the present invention. Initially, in step 310, logic 225 dimensions the power for transmission of the signals by the satellite positioning supplementary system by
  selecting the size of the service area for the satellite in such a way that enough power exists in the satellites of the satellite positioning supplementary system to achieve the required signal strength;
  using suitable geosynchronous orbits, on geosynchronous orbits in or near the equatorial plane, or also on so-called Molniya orbits for a permanently predefined service area and designing the satellite in such a way that so much power is present in the satellite that the required signal strength is achieved;
  selection of the coding of signals transmitted by the satellite; and/or
  tracking the satellite antenna in such a way that optimum signal strength is possible in the service area.

Next, in step 320, logic 230 selects additional information for transmission by the satellite positioning supplementary system, including one or more of:
  precise models for modeling the propagation of satellite navigation signals which may be received in the service area and models which allow the transmission time and the transmission location of the signals of the satellite positioning supplementary system to be ascertained in the timescale of the navigation signal;

a model to ascertain the transmission time in the system timescale of another navigation system;

user messages which are carried on the signals of other navigation systems;

an ionosphere model; and/or a troposphere model.

In step 330, logic 235 controls the transmission by the supplementary satellite system based on the dimensioning of step 310 and including the information selected in step 320.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device of a navigation satellite of a satellite positioning supplementary system comprising:

a unit for generating a navigation signal, wherein the unit is a component of at least one navigation satellite of the satellite positioning supplementary system and the signal strength of the navigation signal is dimensioned in such a way that a receiver of the generated navigation signal can also receive signals of satellite navigation systems other than the satellite positioning supplementary system, wherein the generated navigation signals contain models for modeling the propagation of navigation signals and wherein the troposphere is modeled in such a way that air pressure, temperature, and absolute ambient humidity are transmitted to the receiver as a function of height for selected locations in a service area of the receiver to the signals of the navigation satellite of the satellite positioning supplementary system.

2. The device according to claim 1, wherein the navigation signal is dimensioned by selection of a particular coding of the signals of the satellite positioning supplementary system.

3. The device according to claim 1, wherein a transmission time and transmission location of the navigation signals are determined using the models.

4. The device according to claim 1, wherein the models allow the transmission time of the navigation signals to be ascertained in the system scale of another navigation system.

5. The device according to claim 1, wherein the navigation signals of the satellite also include user messages which are carried on the signals of another navigation systems.

6. A device of a navigation satellite of a satellite positioning supplementary system comprising:

a unit for generating a navigation signal, wherein the signal strength of the navigation signal is dimensioned in such a way that a receiver of the generated navigation signal can also receive signals of satellite navigation systems other than the satellite positioning supplementary system, wherein the ionosphere is described by multiple layers at various heights and the electron density at support points in each layer is transmitted with the reference height for this layer using the signals of the navigation satellites of the satellite positioning supplementary system.

7. The device according to claim 6, wherein the ionosphere model is transmitted on multiple frequencies to the user to ensure that the complete information is transmitted on every frequency, another part of the model parameters is transmitted at each instant of time on different frequencies, and the electron density is determined along the signal propagation paths by interpolation.

8. A method for modeling the signal propagation of a navigation signal comprising:

dimensioning, by a unit of at least one navigation satellite of the satellite positioning supplementary system, the signal strength of the navigation signal in such a way that it is still possible to receive signals of other satellite navigation systems, wherein the generated navigation signals contain models for modeling the propagation of navigation signals and wherein the troposphere is modeled in such a way that air pressure, temperature, and absolute ambient humidity are transmitted to the receiver as a function of height for selected locations in a service area of the receiver to the signals of the navigation satellite of the satellite positioning supplementary system.

9. The method according to claim 8, wherein the navigation signal is dimensioned by selection of a particular coding of the signals of the satellite positioning supplementary system.

10. The method according to claim 8, wherein a transmission time and transmission location of the navigation signals are determined using the models.

11. The method according to claim 8, wherein the models allow the transmission time of the navigation signals to be ascertained in the system scale of another navigation system.

12. The method according to claim 8, wherein the navigation signals of the satellite also include user messages which are carried on the signals of another navigation systems.

13. A method for modeling the signal propagation of a navigation signal comprising:

dimensioning the signal strength of the navigation signal in such a way that it is still possible to receive signals of other satellite navigation systems, wherein the ionosphere is described by multiple layers at various heights and the electron density at support points in each layer is transmitted with the reference height for this layer using the signals of the navigation satellites of the satellite positioning supplementary system.

14. The method according to claim 13, wherein the ionosphere model is transmitted on multiple frequencies to the user to ensure that the complete information is transmitted on every frequency, another part of the model parameters is transmitted at each instant of time on different frequencies, and the electron density is determined along the signal propagation paths by interpolation.

* * * * *